Nov. 4, 1952  G. HEPP  2,617,018
CIRCUIT ARRANGEMENT FOR LIMITING AND DETECTING
FREQUENCY MODULATED OSCILLATIONS
Filed May 2, 1947
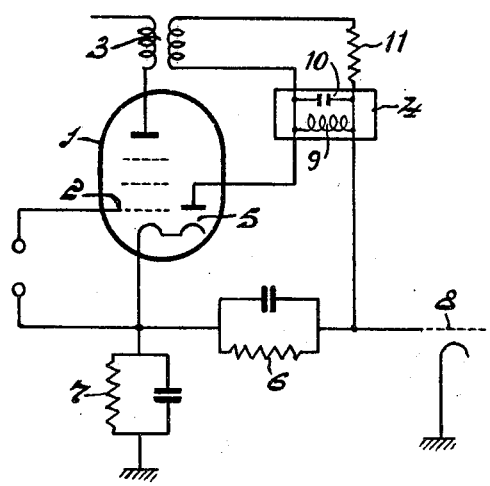
G. HEPP
INVENTOR
BY
ATTORNEY Patented Nov. 4, 1952

2,617,018

UNITED STATES PATENT OFFICE 2,617,018

CIRCUIT ARRANGEMENT FOR LIMITING AND DETECTING FREQUENCY-MODULATED OSCILLATIONS

Gerard Hepp, Eindhoven, Netherlands, assignor to Hartford National Bank and Trust Company, Hartford, Conn., as trustee Application May 2, 1947, Serial No. 745,614
In the Netherlands May 14, 1946

2 Claims. (Cl. 250—20)

In the conventional circuit-arrangements for receiving frequency-modulated oscillations, the latter are fed to an (amplitude) limiter and then to a frequency detector. A frequency detector of this kind comprises, for example, two networks which exhibit oppositely inclined frequency characteristic curves, so that the frequency-modulated oscillations are converted into two amplitude-modulated oscillations which are in phase opposition. The latter oscillations are detected by means of two diodes, after which the difference between the audio frequency voltages set up across the output resistances of the diodes supplies the desired modulated signal.

In addition a similar circuit-arrangement having two diodes is known which serves for detection both of frequency- and amplitude-modulated oscillations, the frequency characteristic curve of one of the said networks being horizontal and that of the other network being sloped. Underlying these circuit-arrangements is the push-pull principle and this has the advantage that the influence of small amplitude fluctuations of the signal residual after the limiter on the oscillations obtained after detection is reduced.

The said circuit-arrangements require three electron tubes, viz one limiter and two diodes, the latter being generally accommodated in one bulb.

The object of the invention is to provide a circuit-arrangement which dispenses with one of these diodes and in which, if desired, the limiter tube and the detector tube may be united in one discharge tube of normal type.

According to the invention, for this purpose the detected signal is constituted by the difference between a voltage which is taken from the output circuit of the limiter and which is proportional to the direct current component of the limited oscillations and a voltage taken from an impedance included in the output circuit of a rectifier to which the limited, frequency-modulated oscillations are supplied via the frequency-dependent network.

The measure according to the invention has the effect of maintaining the advantage which a push-pull detector comprising two diodes exhibits, that is to say interference due to residual amplitude fluctuations of the limited signal is reduced to a marked extent.

The invention is based on recognition of the fact that the direct current component of the current passing through the limiter is proportional to the amplitude of the alternating current component of the superposed frequency. This direct-current component is the same as that which would pass through a diode if the latter were preceded by a network having a horizontal characteristic curve.

In order that the invention may be more clearly understood and readily carried into effect, it will now be explained more fully with reference to the accompanying drawing, in which one embodiment shown by way of example, is illustrated in which the discharge path acting as the limiter and the diode acting as the rectifier are housed in one tube, which consequently, may be of a conventional type, for example, a diode-pentode tube.

Referring to the single figure of the drawing, 1 designates the amplitude limiter, to the grid of which are fed, via a conductor 2, the frequency-modulated oscillations.

The amplitude-limited oscillations are supplied through a high-frequency transformer 3 to a network 4 composed, for example, of the tuned circuit of condenser 10 and inductance 9 which exhibits a frequency discriminating characteristic curve and are then detected with the aid of a diode 5. The detected oscillations are set up across a high-frequency impedance network 6. Set up across a second high-frequency impedance network 7 is a voltage which is proportional to the direct current component of the current passing through the limiter 1. The difference voltage is fed to the grid 8 of an audio frequency amplifier or a final stage respectively.

The filter 6 has thus set up across it an audio frequency voltage which is proportional to the frequency modulation of the incoming signal but also containing a component varying in accordance with amplitude modulations still remaining in the signal as limited. This voltage existing across the network 6 being connected in series with network 7, the amplitude modulation components present in said networks 6 and 7 being opposite in phase, are cancelled, leaving as a residual voltage across the series combination of the two impedance networks 6 and 7, only the audio frequency component represented originally by the frequency modulated signal.

What I claim is:

1. A circuit arrangement for demodulating frequency modulated signals subject to amplitude variations comprising a thermionic discharge system for limiting amplitude variations in said frequency modulated signals and producing amplitude variations solely proportional to the frequency modulated signals including cathode, grid and first and second anode electrodes, means to apply the frequency modulated signals subject to amplitude variations between the grid and cathode, a first resistance-capacitance network between the cathode and one of said anode electrodes and between the cathode and a point of fixed potential for providing a voltage proportional to said amplitude variations, a frequency discriminating network coupled between the first anode and the cathode and in series with the second anode and cathode, and a second resistance-capacitance network in series with the second anode and cathode and coupled between the first anode and the cathode to produce a voltage proportional to frequency deviations in said frequency modulated signal and independent of amplitude variations of said frequency modulated signal.

2. A circuit arrangement for demodulating frequency modulated signals subject to amplitude variations, as claimed in claim 1, in which the second anode is coupled through the frequency modulating network to the first anode and cathode circuit through a transformer.

GERARD HEPP.

REFERENCES CITED

The following references are of record in the file of this patent:

UNITED STATES PATENTS

| Number | Name | Date |
| --- | --- | --- |
| 2,250,862 | Farrington | July 29, 1941 |
| 2,251,382 | Sziklai | Aug. 5, 1941 |
| 2,363,649 | Crosby | Nov. 28, 1944 |
| 2,383,847 | Crosby | Aug. 28, 1945 |
| 2,429,762 | Koch | Oct. 28, 1947 |
| 2,447,564 | Carnahan | Aug. 24, 1948 |